INVENTOR.
ANDREW HARAUTUNEIAN
BY
White & Haefliger
ATTORNEYS.

3,304,353
METHOD OF CATHETER MANUFACTURE
Andrew Harautuneian, Gardena, Calif., assignor to Pharmaseal Laboratories, Glendale, Calif., a corporation of California
Filed Mar. 25, 1963, Ser. No. 267,723
5 Claims. (Cl. 264—98)

This invention has to do with improved methods for the manufacture of balloon-type catheters, i.e., catheters wherein a flexible lumen tube carriers an inflatable surface part that may be enlarged after insertion of the catheter in use.

Heretofore it has been proposed to form such catheters by various techniques including the application to a dual lumen passage tube of a preformed "balloon" material which is inflatable by pressure communicated through a smaller lumen passage. Also proposed has been to apply to a rubber lumen tube a coating or layer which is free from adherence to the tube to an extent permitting of balloon-like inflation.

The present invention has for its general object to provide methods for the manufacture of balloon-type catheters which are superior to the conventional in many respects including dependability for retainable proper inflation in use, capacity for sterilization and avoidance of patent infection as well as irritation by reason of the composition of the catheter parts, relative comfort to the patient due to reduced tube size and soft flexibility of the balloon component, and the embodiment of all these advantages in a catheter that may be made so economically as to justify its disposal after a single use.

The invention contemplates the manufacture of catheters entirely from plastic materials devoid of possible irritants such as rubber compounding or curing agents, all in a manner such that the balloon constitutes, in effect, a terminally integrated surface continuity of the tube creating no bondage or sterilization problems, and having all necessary properties for sustained inflation. By plastic formation of the assembly as later explained it is possible to minimize the tube diameter and balloon bulk, all to greater comfort of the patient.

More specifically, the invention aims to form on a plastic lumen tube a surface layer, easily applicable as by a dipping technique, which has adequate stretchability for safe inflation, and sufficient elastic restorability after inflation as to be removable without undue irritation. It has been found that such properties may be given the balloon layer by making it of an elasatomeric grade of polyurethane such as Goodrich "Estane" or Mobay Chemical "Texin." The term "thermoplastic" herein is defined as exclusive of rubbers, natural or synthetic, because rubbers are thermosetting in that they are vulcanized.

In more particular reference to the surface or balloon layer, the properties desired have been found in poly(ester-urethane) of elastic grade and having a 300% stretch modulus within about the 600 to 1200 p.s.i. range. As an example, I have satisfactorily used Goodrich "Estane #5740x1" polymer, a poly(ester-urethane) elastomer, the properties of which have been published in B. F. Goodrich Chemical Company Bulletin G–18, as revised July 1960, and also in the 1963 Modern Plastics Encyclopedia, pages 188–189.

While in more specific respects the present invention is concerned with the use of particular types and kinds of materials, in its broader aspects the invention is directed to novel methods for application of the balloon layer in a manner assuring its freedom from the tube for inflation. In keeping with this objective, the invention contemplates preliminarily applying to the tube at the location of an opening leading from the smaller lumen passage, a partitioning coating upon which the balloon layer is deposited, and which thereafter is removable from the tube-balloon interface. In its preferred embodiment, the invention provides for the use of a partitioning coating material capable of dissolution in a solvent introduced through the small lumen opening, and preferably employs a water soluble coating or film that will dissolve in water so introduced to free the balloon extent of the surface layer for expansion or inflation. Usable partitioning materials include cold water soluble grades of polyvinyl alcohol, preferably prepared film thereof (see 1963 Modern Plastics Encyclopedia, pages 303–304), methyl cellulose, starch derivatives, dextran or polyvinylpyrrolidone. Of these cold water soluble polyvinyl alcohol is preferred.

The particular manner in which the tube, partitioning coating and surface layer are formed and associated will be now fully understood from the following detailed description of an illustrative embodiment of the invention shown by the accompanying drawing, in which.

Figure 1:
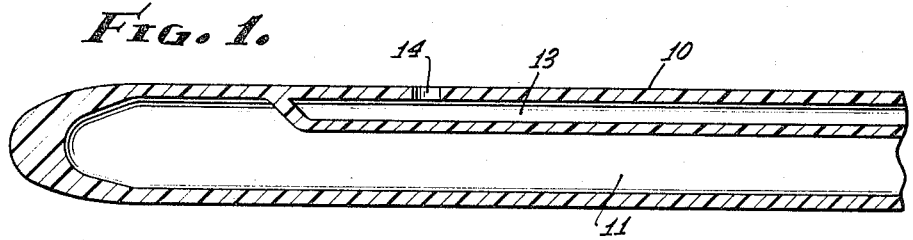
FIG. 1 is a view showing the tip extent of the dual passage lumen tube after reshaping of the tip end of the large passage wall and closing and forming the tip.

The lumen tube 10 is shown to contain for the usual purposes, a relatively large passage 11 and a smaller closed end passage 13 through which fluid may be introduced to opening 14 in the tube wall. It will be understood that any suitable or conventional means may be employed to provide access of the required fluids to the passages 11 and 13. As previously indicated, the tube 10 is made of a suitable plastic, preferably, though typically, of polyvinyl chloride, plasticized to render the tube softly flexible. Methods of forming the lumen itself will be later explained.

Figure 2:
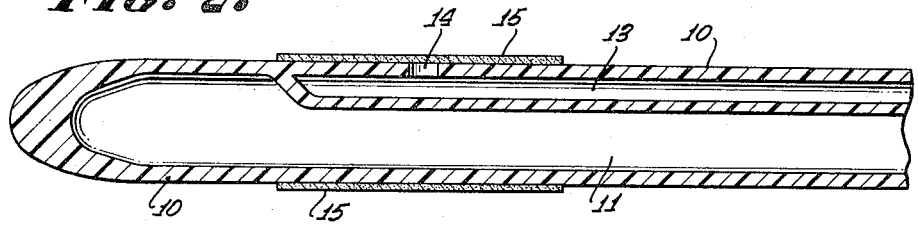
FIG. 2 is a similar view illustrating application of the partitioning film.

Referring to FIG. 2, the initial step toward formation of the balloon is the application of a coating 15 which typically may be in the order of about 0.5–1 mil thick, to that extent of the tube which is to accommodate the balloon and predetermine its dimension axially of the tube, the coated length containing the opening 14. A coating material such as a water soluble grade of polyvinyl alcohol film, has adequate adherence to the surface of the tube 10, while being capable of ready dissolution in aqueous solvent, which usually will be water at room temperature, delivered through passage 13 and opening 14. The ends of the film may be overlapped somewhat so that upon dissolution of the film, the surface or balloon layer will be completely freed for expansion about the tube. The overlapping ends of the film may be smoothed with a heated tool so as to thin and heat seal together the overlapping extents, thus removing any thickened section and eliminating any sharp thick edge which would be apt to form a thin section in the balloon. If desired, the polyvinyl alcohol layer may be rolled over a heated surface to shrink the layer tightly against the catheter body. Following the dip application of the surface layer, opening 12 is formed through the tube wall and layer to provide for fluid flow into or out of passage 11.

Figure 3:
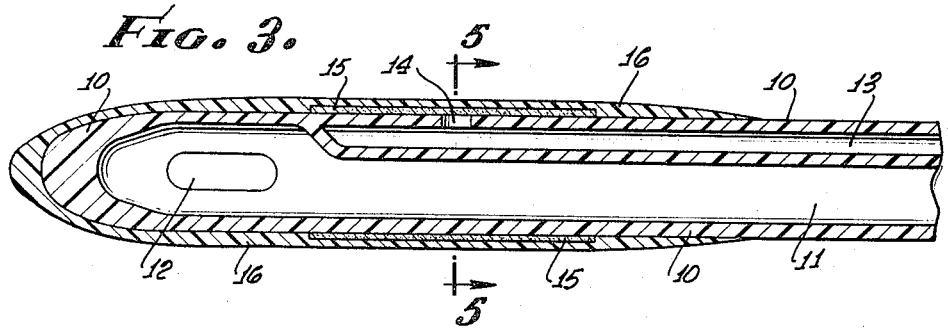
FIG. 3 illustrates completion of the further steps of applying the inflatable surface layer and forming the inlet opening.

After application of the coating 15, a surface layer 16 of the elastic plastic, preferably poly(ester-urethane), is applied as shown in FIG. 3 about the partitioning medium and also to sufficient extents of the tube surface beyond the coating 15 and including the tip end, to provide for secure bondage to the tube. It is found that the layer 16 may be satisfactorily applied to a thickness about the coating of between about 0.003 and 0.008 in. by dipping the tube in the poly (ester-urethane) dissolved in a suitable solvent such as tetrahydrofuran, dimethyl formamide or a 80–20 solution of tetrahydrofuran and cyclohexanone.

Figure 4:
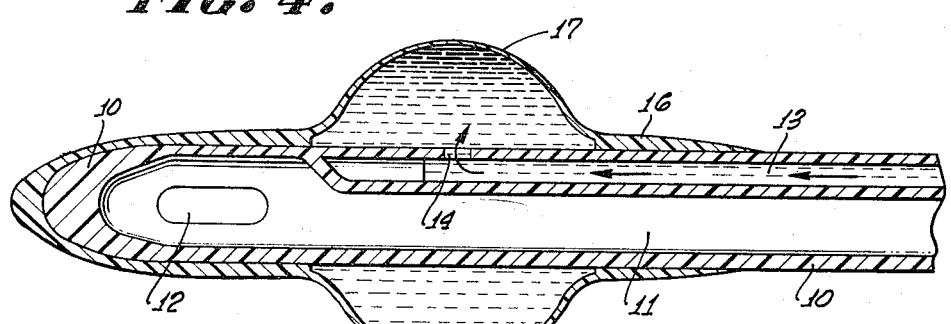
FIG. 4 shows expanded balloon formation.
Figure 5:
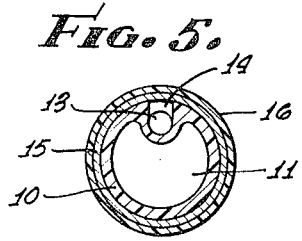
FIG. 5 is a cross section on line 5—5 of FIG. 3.

The catheter is manufactured and supplied for use in FIG. 3 condition. At the time of use, water is fed through passage 13 for access through opening 14 to the partitioning layer 15, resulting in dissolution of the latter and expansion of the corresponding length of the surface layer 13 to form the balloon 17 as shown in FIG. 4, the degree of balloon inflation of course being governable in accordance with the water volume.

As previously indicated, utilizing for the surface layer 16 a plastic material having a 300% modulus of from about 600 to 1200 p.s.i., and preferably at about 1000 p.s.i., the balloon may readily and safely be inflated to at least 250% elongation of the surface layer, with recovery to an extent assuring the patient against undue irritation during removal of the catheter. Its acceptability is further favored by the very pliant softness of the balloon.

In reference now to the total method including formation of the lumen, followed by application of the partitioning coating and inflatable surface layer, the plastic tubing 10 may be extruded at constant cross-section and then cut to desired lengths, preferably directly following the extrusion operation. The tip end of the large lumen 11 is shaped using an appropriated heated tool, during which operation the small lumen 13 is terminally sealed adjacent the enlargement. Opening 14 then is punched in the outer wall of the small lumen. The outer surface of the closed end of the tube is then reformed to provide a smooth, rounded and closed tip. Following insertion of a mandrel into the large lumen 11, the film 15 is wrapped about the tube at the location illustrated and overlapping ends of the film are heat sealed using an appropriate heating tool, which also acts to thin the overlapped ends. The same heated tool may be passed over the entire film 15 so as to shrink it around the tube. The latter then is dipped into an elastomeric solution to a depth above film 14, the dip solution preferably being cooled below room temperature to minimize evaporation and bubble formation. Opening 12 may then be punched through the wall of the tube to communicate with the large lumen. Finally, the edges of the inlet opening may be suitably polished as by the method described in Patent No. 2,972,779.

I claim:

1. A method of making a thermoplastic medical retention catheter comprising the steps of:

(A) forming a thermoplastic tube with a wall surrounding a main lumen passage and with a second passage in this wall;
(B) cutting the tube to length;
(C) closing off one end of said second passage;
(D) forming an opening in the wall of the tube communicating between an exterior of the tube and the second passage;
(E) applying a water soluble partitioning coating cylindrically and continuously around the tube adjacent said opening;
(F) covering said coating with a thermoplastic balloon layer from a liquid organic solvent system, said balloon layer bonding to the tube beyond ends of said coating, which coating remains intact during this step; and
(G) dissolving the partitioning coating by an aqueous liquid injected through the second passage and wall opening to inflate the balloon, whereby material of said partitioning coated dissolved in the inflation liquid can exit through the opening in the tube wall and along the second passage as the inflation liquid is withdrawn to deflate the balloon.

2. The method according to claim 1 in which said water soluble partitioning coating is applied by wrapping a preformed film of the liquid-soluble coating around the tube.

3. The method according to claim 1 in which said partitioning coating is methyl cellulose.

4. The method according to claim 1 wherein said thermoplastic tube is formed by extrusion.

5. The method according to claim 1 including the step of forming a rounded closed end at the terminal end of the thermoplastic tube in spaced relation from the closed end of said second passage.

References Cited by the Examiner

UNITED STATES PATENTS

| | | | |
|---|---|---|---|
| 1,595,006 | 8/1926 | Kelly et al. | 156—155 |
| 2,230,151 | 1/1941 | Winder | 264—94 |
| 2,390,070 | 12/1945 | Auzin | 264—250 |
| 2,687,997 | 8/1954 | Marchand | 264—177 XR |
| 2,736,921 | 3/1956 | Mulbarger et al. | 264—177 XR |
| 2,876,496 | 3/1959 | Murphy. | |
| 2,952,039 | 9/1960 | Jaffe | 264—177 XR |
| 3,074,107 | 1/1963 | Kiyoshi Mase et al. | 264—177 XR |

ROBERT F. WHITE, *Primary Examiner.*

ALEXANDER H. BRODMERKEL, *Examiner.*

J. A. FINLAYSON, M. R. DOWLING, J. R. DUNCAN,
*Assistant Examiners.*